(12) United States Patent
Shao et al.

(10) Patent No.: US 12,555,269 B2
(45) Date of Patent: Feb. 17, 2026

(54) INTELLIGENT MANUFACTURING INDUSTRIAL INTERNET OF THINGS WITH FRONT SPLIT SERVICE PLATFORM FOR CALIBRATING BINOCULAR CAMERA, CONTROL METHOD AND MEDIUM THEREOF

(71) Applicant: CHENGDU QINCHUAN IOT TECHNOLOGY CO., LTD., Sichuan (CN)

(72) Inventors: Zehua Shao, Chengdu (CN); Lei Zhang, Chengdu (CN); Yaqiang Quan, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/967,707

(22) Filed: Dec. 4, 2024

(65) Prior Publication Data

US 2025/0095206 A1  Mar. 20, 2025

Related U.S. Application Data

(63) Continuation of application No. 18/049,642, filed on Oct. 26, 2022, now Pat. No. 12,190,545.

(51) Int. Cl.
*G06T 7/80* (2017.01)
*G06T 7/00* (2017.01)
*H04N 13/239* (2018.01)

(52) U.S. Cl.
CPC ............. *G06T 7/85* (2017.01); *G06T 7/0004* (2013.01); *H04N 13/239* (2018.05); *G06T 2207/10012* (2013.01); *G06T 2207/20081* (2013.01); *G06T 2207/30108* (2013.01); *G06T 2207/30168* (2013.01)

(58) Field of Classification Search
None
See application file for complete search history.

(56) References Cited

U.S. PATENT DOCUMENTS

| | | |
|---|---|---|
| 7,659,921 B2 | 2/2010 | Aoyama |
| 11,442,463 B1 | 9/2022 | Fotland et al. |
| 12,007,228 B2 | 6/2024 | Adams et al. |
| 2008/0123937 A1 | 5/2008 | Arias Estrada et al. |

(Continued)

*Primary Examiner* — Stefan Gadomski
(74) *Attorney, Agent, or Firm* — PORUS IP LLC (57) ABSTRACT

An intelligent manufacturing industrial Internet of Things with a front split service platform for calibrating a binocular camera is provided, which includes: an obtaining module configured to obtain an image taken by a first camera on a production line as a first image data and an image taken by a second camera as a second image data through a sensor network platform; a three-dimensional module configured to process into three-dimensional image data; a recognition module configured to obtain a plurality of point positions of a distortion part as judgment point positions; a mapping module configured to map the judgment point positions to the second image data to form second calibration point positions; and a calibration module configured to calibrate the first camera and the second camera according to first calibration point positions and the second calibration point positions.

20 Claims, 5 Drawing Sheets

(56) References Cited

U.S. PATENT DOCUMENTS

| | | | |
|---|---|---|---|
| 2010/0232683 A1* | 9/2010 | Fujieda | G06T 7/344 |
| | | | 382/154 |
| 2010/0232684 A1* | 9/2010 | Fujieda | G06T 7/85 |
| | | | 382/154 |
| 2011/0158509 A1 | 6/2011 | Li et al. | |
| 2013/0083168 A1 | 4/2013 | Kim et al. | |
| 2014/0294286 A1 | 10/2014 | Kitajima | |
| 2015/0261966 A1 | 9/2015 | Mensch et al. | |
| 2017/0188015 A1 | 6/2017 | Heidemann et al. | |
| 2017/0221226 A1 | 8/2017 | Shen et al. | |
| 2017/0347030 A1 | 11/2017 | Guerreiro et al. | |
| 2018/0103244 A1 | 4/2018 | Fang et al. | |
| 2018/0124321 A1 | 5/2018 | Hayasaka | |
| 2018/0197320 A1 | 7/2018 | Lim et al. | |
| 2018/0222049 A1 | 8/2018 | Suzuki et al. | |
| 2018/0262749 A1 | 9/2018 | Goldentouch et al. | |
| 2019/0058870 A1* | 2/2019 | Rowell | H04N 13/189 |
| 2019/0147606 A1 | 5/2019 | Zhuang et al. | |
| 2019/0158813 A1* | 5/2019 | Rowell | H04N 13/111 |
| 2021/0243422 A1 | 8/2021 | Hayasaka et al. | |
| 2021/0264674 A1 | 8/2021 | Shahrokni et al. | |
| 2022/0003581 A1 | 1/2022 | Fox et al. | |
| 2022/0028117 A1 | 1/2022 | Mizohana et al. | |
| 2022/0032969 A1 | 2/2022 | Sugiura et al. | |
| 2022/0046220 A1 | 2/2022 | Zhong et al. | |
| 2022/0092292 A1 | 3/2022 | Gao et al. | |
| 2023/0177712 A1 | 6/2023 | Kang et al. | |
| 2023/0370577 A1 | 11/2023 | Zhang | |
| 2024/0185464 A1* | 6/2024 | Oi | H04N 17/002 |

\* cited by examiner

```
┌─────────────────────────────────────────────────────────┐
│ Obtaining the image captured by the first camera on the │
│ production line as the first image data and the image   │──  S1
│ captured by the second camera as the second image data  │
│ through the sensor network platform; the first camera   │
│ and the second camera forming the binocular camera      │
└─────────────────────────────────────────────────────────┘
                            │
                            ▼
┌─────────────────────────────────────────────────────────┐
│ Processing the first image data and the second image    │──  S2
│ data into the three-dimensional image data              │
└─────────────────────────────────────────────────────────┘
                            │
                            ▼
┌─────────────────────────────────────────────────────────┐
│ Obtaining a plurality of point positions of the         │
│ distortion part as the judgment point positions when    │──  S3
│ detecting the distortion of the three-dimensional image │
│ data                                                    │
└─────────────────────────────────────────────────────────┘
                            │
                            ▼
┌─────────────────────────────────────────────────────────┐
│ Mapping the judgment point positions to the first image │
│ data to form the first calibration point positions, and │──  S4
│ mapping the judgment point positions to the second      │
│ image data to form the second calibration point         │
│ positions                                               │
└─────────────────────────────────────────────────────────┘
                            │
                            ▼
┌─────────────────────────────────────────────────────────┐
│ Calibrating the first camera and the second camera      │
│ according to the first calibration point positions and  │──  S5
│ the second calibration point positions                  │
└─────────────────────────────────────────────────────────┘
```

```
┌─────────────────────────────────────────────────────────┐
│ Obtaining the mapping matrix, the mapping matrix        │── 310
│ representing a mapping relationship between any two     │
│ of the three-dimensional image data, the first camera,  │
│ and the second camera, and the mapping matrix           │
│ including a rotation matrix and a translation matrix    │
└─────────────────────────────────────────────────────────┘
                            │
┌─────────────────────────────────────────────────────────┐
│ Determining the calibration value based on the          │── 320
│ mapping matrix                                          │
└─────────────────────────────────────────────────────────┘
                            │
┌─────────────────────────────────────────────────────────┐
│ Mapping the judgment point positions to the first       │
│ image data to form the first calibration point          │── 330
│ positions, and mapping the judgment point positions to  │
│ the second image data to form the second calibration    │
│ point positions based on the calibration value          │
└─────────────────────────────────────────────────────────┘
```

INTELLIGENT MANUFACTURING INDUSTRIAL INTERNET OF THINGS WITH FRONT SPLIT SERVICE PLATFORM FOR CALIBRATING BINOCULAR CAMERA, CONTROL METHOD AND MEDIUM THEREOF

CROSS-REFERENCE TO RELATED APPLICATIONS

This application is a Continuation of U.S. patent application Ser. No. 18/049,642, filed on Oct. 26, 2022, the contents of which are incorporated herein by reference.

TECHNICAL FIELD

The disclosure relates to the technical field of industrial Internet of Things, and particularly to an intelligent manufacturing industrial Internet of Things with a front split service platform, a control method and medium thereof.

BACKGROUND

Machine vision is a rapidly developing branch of artificial intelligence. Simply put, machine vision is to use machines instead of human eyes to make measurements and judgments. The machine vision system converts the captured target into an image signal through a machine vision device (i.e., an image capture device, including CMOS and CCD), transmits the image signal to a dedicated image processing system to obtain the morphological information of the captured target, and converts the morphological information into a digital signal according to pixel distribution and brightness, color and other information. The image processing system performs various operations on these signals to extract the features of the target, and then controls the operation of the equipment in the field according to the result of the judgement.

The accuracy of machine vision is the basis for realizing device control on the Industrial Internet of Things. In order to obtain visual images with depth of field, existing technologies often use binocular cameras to obtain 3D images. The binocular camera needs to be calibrated before use. The purpose of the calibration is to correspondingly map the coordinates of the images collected by the two cameras of the binocular camera, so that the captured target may be imaged in the same coordinate system, and then the depth of field may be obtained. However, in the production line, the binocular camera may produce errors due to the vibration of the production line or other external factors, which may reduce the accuracy of 3D imaging and cause distortion of the 3D image.

SUMMARY

In order to at least overcome the above-mentioned deficiencies in the prior art, the purpose of this disclosure is to provide an intelligent manufacturing industrial Internet of Things with a front split service platform and a control method.

In the first aspect, the embodiments of this disclosure provide an intelligent manufacturing industrial Internet of Things with a front split service platform, including a service platform, a management platform, and a sensor network platform which interact in sequence, and the management platform includes:

an obtaining module configured to obtain an image taken by a first camera on a production line as a first image data and an image taken by a second camera as a second image data through the sensor network platform; the first camera and the second camera forming a binocular camera;

a three-dimensional module configured to process the first image data and the second image data into a three-dimensional image data;

a recognition module configured to obtaining a plurality of point positions of a distortion part as judgment point positions when detecting the distortion of the three-dimensional image data;

a mapping module configured to obtain a mapping matrix, wherein the mapping matrix represents a mapping relationship between any two of the three-dimensional image data, the first camera, and the second camera, the mapping matrix including a rotation matrix and a translation matrix; determine a prediction value of the mapping matrix based on the mapping matrix; determine a calibration value based on the prediction value; and map the judgment point positions to the first image data to form first calibration point positions based on the calibration value, and map the judgment point positions to the second image data to form second calibration point positions; and a calibration module configured to calibrate the first camera and the second camera according to the first calibration point positions and the second calibration point positions.

The service platform includes:

a plurality of service sub-platform configured to receive different calibration data of the binocular camera respectively; and a general service platform configured to summarize all the calibration data and display through a user platform.

In the prior art, the inventor found in scientific practice that the main method for calibrating the binocular camera is to set a checkerboard in a still image, which is specifically implemented by Zhang Zhengyou's calibration method. However, this method needs to add a calibration checkerboard to the image, which means that the production line needs to be stopped for calibration, which seriously affects the efficiency of the production line.

When the embodiments of this disclosure are implemented, the obtaining module may obtain the first image data and the second image data by means of traditional machine vision image acquisition, and generate the three-dimensional image data by means of the prior art. In the embodiments of this disclosure, the recognition module is configured to detect the distortion of the three-dimensional image data, and the detection process may be performed through image comparison or template comparison, which is not limited in the embodiments of this disclosure. When it is determined that the three-dimensional image data is distorted, the recognition module may obtain the judgment point positions of the distortion part, and the number of the judgment point positions may be determined according to the selected calibration algorithm. Exemplarily, for Zhang Zhengyou's calibration method, at least six groups of judgment point positions are required for calibration. The corresponding judgment point positions are respectively mapped to the first image data and the second image data by the mapping module to obtain the first calibration point positions and the second calibration point positions for calibration, i.e., the on-site binocular camera calibration may be performed through the calibration module, and the calibration may be performed without stopping the production line. Through the above-mentioned modules in the embodiments of this disclosure, on the one hand, timely correction of binocular camera calibration may be implemented without stopping the production line, on the other hand, the influence of binocular camera calibration errors may be reduced, the accuracy of three-dimensional machine vision recognition may be improved, and the production efficiency and equipment operation accuracy may be effectively improved.

In the second aspect, the embodiments of this disclosure provide a control method of the intelligent manufacturing industrial Internet of Things with the front split service platform, which is applied to the service platform, the management platform, and the sensor network platform which interact in sequence, and the service platform includes a general service platform and a plurality of service sub-platform;

the control method executed by the management platform includes:

obtaining the image taken by the first camera on the production line as the first image data, and the image taken by the second camera as the second image data through the sensor network platform; the first camera and the second camera forming the binocular camera;

processing the first image data and the second image data into the three-dimensional image data;

obtaining a plurality of point positions of the distortion part as the judgment point positions when detecting the distortion of the three-dimensional image data;

mapping the judgment point positions to the first image data to form the first calibration point positions, and mapping the judgment point positions to the second image data to form the second calibration point positions;

calibrating the first camera and the second camera according to the first calibration point positions and the second calibration point positions;

the service sub-platforms receiving different calibration data of the binocular camera respectively; and the general service platform summarizing all the calibration data and displaying through the user platform.

One of the embodiments of this disclosure provides a non-transitory computer readable storage medium, the storage medium stores computer instructions, and when a computer reads the computer instructions in the storage medium, the computer executes the control method of the intelligent manufacturing industrial Internet of Things with the front split service platform.

Compared with the prior art, this disclosure has the following advantages and beneficial effects: according to the intelligent manufacturing industrial Internet of Things with the front split service platform and the control method, on the one hand, the calibration of the binocular camera may be performed under the premise that the production line does not stop working, on the other hand, the influence of the calibration error of the binocular camera may be reduced, thereby improving the accuracy of three-dimensional machine vision recognition, and effectively improving the production efficiency and equipment operation accuracy.

BRIEF DESCRIPTION OF THE DRAWINGS

The accompanying drawings described herein are used to provide a further understanding of the embodiments of the present disclosure, and constitute a part of the present disclosure, and do not constitute a limitation on the embodiments of the present disclosure. In the drawings.

DETAILED DESCRIPTION

In order to make the purposes, technical solutions and advantages of the embodiments of this disclosure clearer, the technical solutions in the embodiments of this disclosure may be clearly and completely described below with reference to the accompanying drawings in the embodiments of this disclosure. It should be understood that the accompanying drawings in this disclosure are only for the purpose of illustration and description, and are not used to limit the protection scope of this disclosure. In addition, it should be understood that the schematic drawings are not drawn to scale. The flowcharts used in this disclosure illustrate operations implemented in accordance with some of the embodiments of this disclosure. It should be understood that the operations of the flowcharts may be performed out of order and that steps without logical context may be performed in reverse order or concurrently. In addition, technicians skilled in the art may add one or more other operations to the flowchart, and may also remove one or more operations from the flowchart under the guidance of the contents of this disclosure.

In addition, the described embodiments are only some of the embodiments of the present disclosure, but not all of the embodiments. The components of the embodiments of this disclosure generally described and illustrated in the drawings herein may be arranged and designed in a variety of different configurations. Therefore, the following detailed description of the embodiments of the present disclosure provided in the accompanying drawings is not intended to limit the scope of the present disclosure as claimed, but is merely representative of selected embodiments of the present disclosure. Based on the embodiments of this disclosure, all other embodiments obtained by technicians skilled in the art without creative efforts shall fall within the protection scope of this disclosure. As used herein, the singular forms "a," "an," and "the" may be intended to include the plural forms as well, unless the context clearly indicates otherwise; the plural forms may be intended to include the singular form as well.

Figure 1:
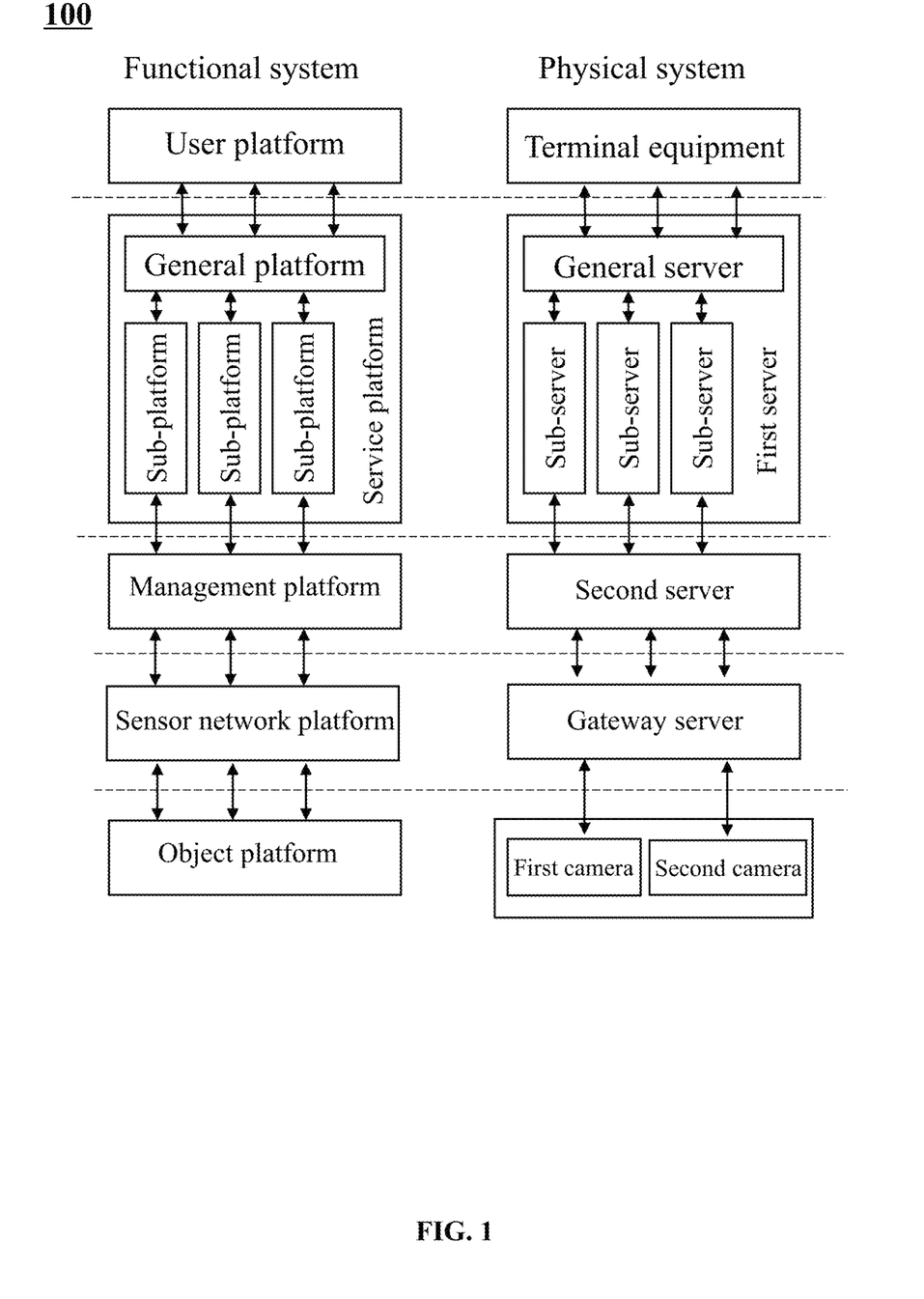
FIG. 1 is a schematic diagram of a system architecture according to the embodiments of the present disclosure.

In order to facilitate the elaboration of the above-mentioned intelligent manufacturing industrial Internet of Things with the front split service platform, please refer to FIG. 1, which provides a schematic diagram of a communication architecture of the intelligent manufacturing industrial Internet of Things with the front split service platform disclosed in the embodiments of this disclosure. The intelligent manufacturing industrial Internet of Things with the front split service platform may include a service platform, a management platform and a sensor network platform which interact in sequence. The management platform includes an obtaining module, a three-dimensional module, a recognition module, a mapping module, and a calibration module.

The obtaining module is configured to obtain an image taken by a first camera on a production line as first image data and an image taken by a second camera as second image data through the sensor network platform; the first camera and the second camera forming a binocular camera.

The first camera and the second camera refer to camera equipment for taking images at the production line. The first camera and the second camera may include a plurality of types of camera equipment, such as an RGB camera, an infrared camera, etc. The first camera and the second camera may form the binocular camera, and there are various types of binocular cameras, such as a binocular zoom camera, a binocular black light camera, etc.

The first image data refers to the data of the image taken by the first camera. The second image data is the image of the image taken by the second camera. The first image data and the second image data may include the size, color, shape and other data of the images.

The three-dimensional module is configured to process the first image data and the second image data into a three-dimensional image data.

The three-dimensional image data refers to a stereo image data obtained after processing the first image data and the second image data. For example, the three-dimensional image data may include the size, color, shape and other data of the images.

The recognition module is configured to obtain a plurality of point positions of a distortion part as judgment point positions when detecting the distortion of the three-dimensional image data.

In some embodiments, the judgment point positions may be represented by coordinates in the three-dimensional image data, for example, the coordinates of the judgment point positions are (7, 4, 0), etc. For detailed instructions on the distortion detection of the three-dimensional image data and the judgment point positions of the distortion part, please see the following relevant content of the image comparison, template comparison and Zhang Zhengyou's calibration method.

The mapping module is configured to map the judgment point positions to the first image data to form first calibration points, and map the judgment point positions to the second image data to form second calibration point positions.

The first calibration point positions refer to point positions in the first image data corresponding to the judgment point positions determined based on a calibration value of a mapping matrix between the three-dimensional image data and the first image data. In some embodiments, the first calibration point positions may be represented by coordinates in the first image data, such as coordinates (3, 2), etc.

The second calibration point positions refer to point positions in the second image data corresponding to the judgment point positions determined based on a calibration value of a mapping matrix between the three-dimensional image data and the second image data. In some embodiments, the second calibration point positions may be represented by coordinates in the second image data, such as coordinates (6,4), etc.

Figure 3:
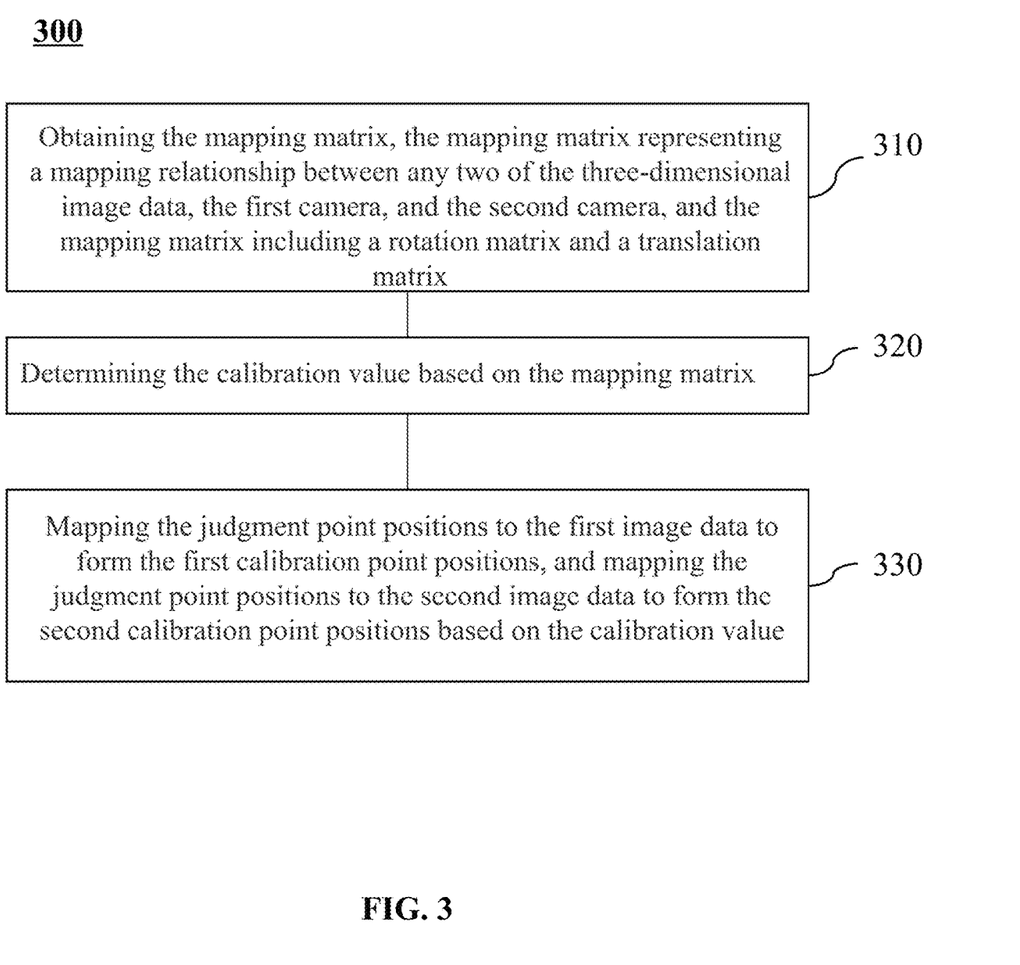
FIG. 3 is an exemplary flowchart of forming the first calibration point positions and the second calibration point positions based on the calibration value according to some embodiments of this disclosure.

For the definition and explanation of the mapping matrix and the calibration value, please refer to the relevant content of FIG. 3.

In some embodiments, the mapping module is further configured to: obtain the mapping matrix. The mapping matrix represents a mapping relationship between the three-dimensional image data, the first camera, and the second camera, and the mapping matrix includes a rotation matrix and a translation matrix. The mapping module is further configured to: determine the calibration value based on the mapping matrix; and map the judgment point positions to the first image data to form the first calibration point positions, and map the judgment point positions to the second image data to form the second calibration point positions based on the calibration value. For more content about the above, please see the relevant descriptions in FIG. 3.

The calibration module is configured to calibrate the first camera and the second camera based on the first calibration point positions and the second calibration point positions.

The service platform includes:
a plurality of service sub-platforms configured to receive different calibration data of the binocular camera separately; and
a general service platform configured to summarize all the calibration data and display it through the user platform.

In the prior art, the inventor found in scientific practice that the main method for calibrating the binocular camera is to set a checkerboard in a still image, which is specifically realized by Zhang Zhengyou's calibration method. However, this method needs to add a calibration checkerboard to the image, which means that the production line needs to be stopped for calibration, which seriously affects the efficiency of the production line.

When the embodiments of this disclosure are implemented, the obtaining module may obtain the first image data and the second image data by means of traditional machine vision image acquisition, and generate the three-dimensional image data by means of the prior art. In the embodiment of this disclosure, the recognition module is configured to detect the distortion of the three-dimensional image data, and the detection process may be performed through image comparison or template comparison, which is not limited in the embodiment of this disclosure. When it is determined that the three-dimensional image data is distorted, the recognition module may obtain the judgment point positions from the distortion part, and the number of judgment points may be determined according to the selected calibration algorithm. Exemplarily, for Zhang Zhengyou's calibration method, at least six groups of judgment point positions are required for calibration. The judgment point positions are respectively mapped to the first image data and the second image data by the mapping module to obtain the first calibration point positions and the second calibration point positions for calibration. The on-site binocular camera calibration may be performed through the calibration module, and calibration may be performed without stopping the production line. Through the above-mentioned modules in the embodiments of this disclosure, on the one hand, timely correction of binocular camera calibration may be realized without stopping the production line, on the other hand, the influence of errors in the binocular camera calibration may be reduced, the accuracy of three-dimensional machine vision recognition can be improved, and the production efficiency and equipment operation accuracy can be effectively improved.

In one possible implementation, the recognition module is further configured to:
- detect whether the three-dimensional image data is distorted according to a preset template;
- establish a region of interest with the point of maximum distortion as the center when detecting the distortion of the three-dimensional image data;
- recognize at least two continuous distortion edges from the region of interest according to the preset template, and if the at least two continuous distortion edges are not recognized, redefine the region of interest and perform recognition;
- recognize a separation edge and a common edge from the distortion edges according to the preset template, and extract a plurality of point positions from the separation edge as the first point positions, and extract a plurality of point positions from the common edge as the second point positions; the separation edge being an edge where the same points in the first image data and the second image data do not overlap in the three-dimensional image data; the common edge being an edge where the same points in the first image data and the second image data overlap in the three-dimensional image data; and
- use the first point positions and the second point positions as the judgment point positions.

When the embodiment of this disclosure is implemented, the inventor finds that when distortion occurs, the main manifestation of the distortion part is that the part that should be represented as the same line in the three-dimensional image data becomes the lines that are not overlapped, so the inventor adopts the preset template method to detect the distortion and recognize the distortion part. The preset template generally adopts three-dimensional image data, and the preset template may include edges for recognition based on fixed edges in the three-dimensional image data, and the recognition of the distortion edges may be realized by these edges in the preset template. In order to effectively improve the accuracy of calibration, the embodiments of this disclosure divide the recognized distortion edges into the separation edge and the common edge. The separation edge is the edge where the distortion occurs, and the common edge is the edge where the distortion does not occur within a predetermined range of the separation edge. Due to the separate setting of the separation edge and the common edge, in the subsequent calibration process, the calibration check may be performed based on the characteristics of the separation edge and the common edge, which effectively improves the calibration accuracy.

In one possible implementation, the calibration module is further configured to:
- when calibrating the first camera and the second camera according to the first calibration point positions and the second calibration point positions, invert the calibration matrix for generating the three-dimensional image data according to first check point positions, and check an inversion result according to second check point positions to form adjustment parameters of the first camera and/or the second camera; the first check point positions being the first calibration point positions and the second calibration point positions generated by the first point position mapping (e.g., mapping the first point positions into the first image data and the second image data, respectively); the second check point positions being the first calibration point positions and the second calibration point positions generated by the second point position mapping (e.g., mapping the second point positions into the first image data and the second image data, respectively); and
- calibrate the first camera and/or the second camera based on the adjustment parameters.

When the embodiments of this disclosure are implemented, data inversion is performed through at least the first check point positions, that is, the coordinates are reversed through the calibration matrix, the adjustment relationship that may be directly completed by the first camera and the second camera may be calculated, and the adjustment relationship may be checked at the second check point positions without distortion, so that the inversion at the first check point positions is not over-fitted, and the fitting accuracy is effectively improved.

It should be understood that the calibration matrix is generated during the initial calibration of the binocular camera, and is used to represent the mapping relationship between the image coordinates captured by the binocular camera and the coordinates in the three-dimensional image data. For different initial calibration methods, the obtained calibration matrices are different, and technicians skilled in the art may select the calibration matrix as required. Exemplarily, for Zhang Zhengyou's calibration method, the calibration matrix may be an internal parameter matrix and external parameter matrix.

In one possible implementation, the preset template includes a plurality of recognition edges.

The recognition module is further configured to:
- periodically compare the preset template with the three-dimensional image data, and judge that the three-dimensional image data is distorted when the difference between any recognized edge and the corresponding edge data in the three-dimensional image data is greater than a preset value.

When the embodiment of the present disclosure is implemented, the recognition edges set in the preset template are the basis for determining the distortion in the embodiment of the present disclosure. Through periodic recognition, it is possible to determine whether the three-dimensional image data is distorted. That the difference between each recognition edge and the edge data is greater than the preset value may be realized by using the existing line comparison mechanism, such as fitting, etc., which may not be repeated here in this disclosure.

In one possible implementation, the recognition module is further configured to:
- recognize the distortion edge from the region of interest according to each of the recognition edges in the preset template as the separation edge, and extend the separation edge along the recognition edges to form the common edge.

When the embodiment of this disclosure is implemented, the separation edge is recognized by the recognition edges, and the end points of the separation edge are extended along the recognition edges to form the common edge, so as to obtain the first point positions and the second point positions, and improve the accuracy of detection.

In some embodiments, the mapping module may also be used to obtain the mapping matrix. The mapping matrix represents a mapping relationship between any two of the three-dimensional image data, the first camera, and the second camera, and the mapping matrix includes a rotation matrix and a translation matrix; determine the calibration value based on the mapping matrix; map the judgment point positions to the first image data to form the first calibration point positions and map the judgment point positions to the second image data to form the second calibration point positions based on the calibration value.

In some embodiments, the mapping module may also be used to determine a prediction value of the mapping matrix based on the mapping matrix; and determine the calibration value of the mapping matrix based on the prediction value.

In some embodiments, the mapping module may be further configured to predict a first prediction value of the first mapping matrix by using a first prediction model based on the first mapping matrix. The first prediction model is a machine learning model, and the input of the first prediction model includes a first theoretical value of the first mapping matrix, a conveying speed of a conveyor belt, and a motion sensor data; and predict a second prediction value of the second mapping matrix through a second prediction model based on the second mapping matrix. The second prediction model is a machine learning model, and the input of the second prediction model includes a second theoretical value of the second mapping matrix, the conveying speed of the conveyor belt, and the motion sensor data.

In some embodiments, the mapping module may be further configured to determine a first calibration value of the first mapping matrix and a second calibration value of the second mapping matrix through a binocular calibration model based on the first prediction value and the second prediction value. The binocular calibration model is a machine learning model, the first calibration value includes a first rotation matrix calibration value and a first translation matrix calibration value, the second calibration value includes a second rotation matrix calibration value and a second translation matrix calibration value, the first calibration value is used to map the judgment point positions to the first image data to form the first calibration point positions, and the second calibration value is used to map the judgment point positions to the second image data to form the second calibration point positions.

In some embodiments, the training method of the first prediction model, the second prediction model and the binocular calibration model includes joint training.

In some embodiments, the input of the binocular calibration model includes reference point position information. The reference point position information includes at least one of a first position and a second position of a reference point position. The reference point position is a preset point position in the three-dimensional image data. The first position is a position in the first image data corresponding to the reference point position. The second position is the position in the second image data corresponding to the reference point position.

In some embodiments, the reference point position information further includes an offset. The offset is a vector difference between a first position vector and a second position vector of the second position. The first position vector is a vector of a position to which the first position is mapped in the second image data based on a binocular prediction value of a binocular mapping matrix, and the binocular mapping matrix is the mapping between the first camera and the second camera.

In some embodiments, the mapping module may also be configured to determine a binocular prediction value based on the first prediction value and the second prediction value.

Figure 2:
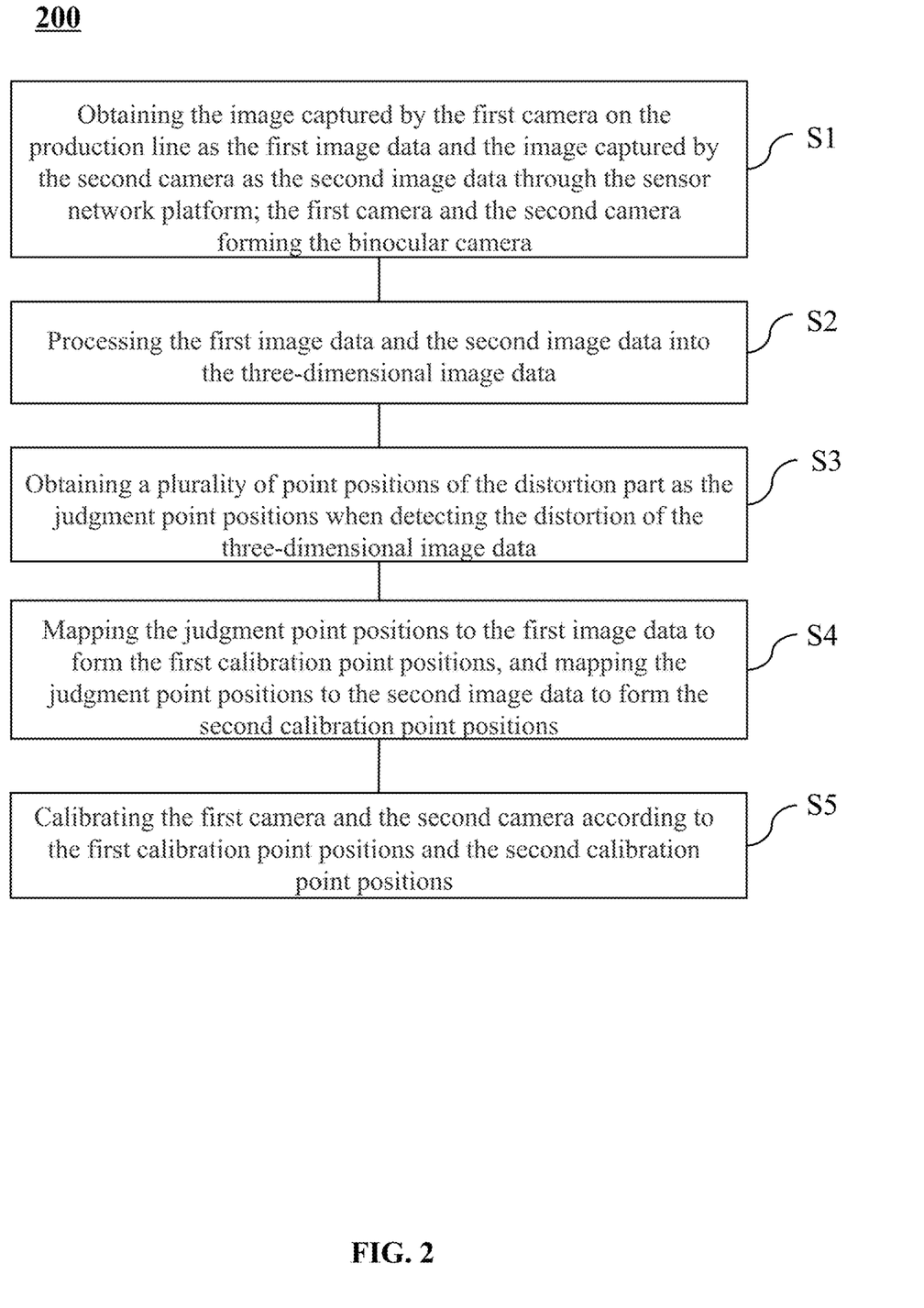
FIG. 2 is a schematic diagram of the steps of the method according to the embodiments of the present disclosure.

On the basis of the above, please refer to FIG. 2, which is a schematic flowchart of the control method of the intelligent manufacturing industrial Internet of Things with the front split service platform provided by the embodiment of the present disclosure. The control method of the intelligent manufacturing industrial Internet of Things with the front split service platform may be applied to the intelligent manufacturing industrial Internet of Things with the front split service platform in FIG. 1. Further, the control method of the intelligent manufacturing industrial Internet of Things with the front split service platform may specifically include the content described in the following steps S1-S5.

S1: Obtaining the image captured by the first camera on the production line as the first image data and the image captured by the second camera as the second image data through the sensor network platform; the first camera and the second camera forming the binocular camera;

S2: processing the first image data and the second image data into the three-dimensional image data;

S3: obtaining a plurality of point positions of the distortion part as the judgment point positions when detecting the distortion of the three-dimensional image data;

S4: mapping the judgment point positions to the first image data to form the first calibration point positions, and mapping the judgment point positions to the second image data to form the second calibration point positions; and S5: calibrating the first camera and the second camera according to the first calibration point positions and the second calibration point positions.

In a possible implementation, the obtaining a plurality of point positions of the distortion part as the judgment point positions when detecting the distortion of the three-dimensional image data includes:

detecting whether the three-dimensional image data is distorted according to the preset template;

establishing a region of interest with the point of maximum distortion as the center when detecting the distortion of the three-dimensional image data;

recognizing at least two continuous distortion edges from the region of interest according to the preset template, and if the at least two continuous distortion edges are not recognized, redefining the region of interest and performing recognition;

recognizing the separation edge and the common edge from the distortion edges according to the preset template, and extracting a plurality of point positions from the separation edge as the first point positions, and extracting a plurality of point positions from the common edge as the second point positions; the separation edge being an edge where the same points in the first image data and the second image data do not overlap in the three-dimensional image data; the common edge being an edge where the same points in the first image data and the second image data overlap in the three-dimensional image data; and using the first point positions and the second point positions as the judgment point positions.

In a possible implementation, the calibrating the first camera and the second camera according to the first calibration point positions and the second calibration point positions includes:

when calibrating the first camera and the second camera according to the first calibration point positions and the second calibration point positions, inverting the calibration matrix for generating the three-dimensional image data according to the first check point positions, and checking the inversion result according to the second check point positions to form the adjustment parameters of the first camera and/or the second camera; the first check point positions being the first calibration point positions and the second calibration point positions generated by the first point position mapping; the second check point positions being the first calibration point positions and the second calibration point positions generated by the second point position mapping; and calibrating the first camera and/or the second camera based on the adjustment parameters.

In one possible implementation, the preset template includes a plurality of recognition edges.

The detecting whether the three-dimensional image data is distorted according to the preset template includes:

periodically comparing the preset template with the three-dimensional image data, and judging that the three-dimensional image data is distorted when the difference between any recognized edge and the corresponding edge data in the three-dimensional image data is greater than the preset value.

In one possible implementation, the recognizing the separation edge and the common edge from the distortion edges according to the preset template includes:

recognizing the distortion edges from the region of interest according to each of the recognition edges in the preset template as the separation edge, and extending the separation edge along the recognition edge to form the common edge.

FIG. 3 is an exemplary flowchart of forming the first calibration point positions and the second calibration point positions based on the calibration value according to some embodiments of this disclosure. As shown in FIG. 3, the process 300 includes the following steps. In some embodiments, the process 300 may be executed by the mapping module.

Step 310, obtaining the mapping matrix, the mapping matrix representing a mapping relationship between any two of the three-dimensional image data, the first camera, and the second camera, and the mapping matrix including a rotation matrix and a translation matrix.

For the definition and explanation of the three-dimensional image data, the first camera, and the second camera, please refer to the relevant content of FIG. 1.

The mapping matrix may represent the mapping relationship between any two of the three-dimensional image data, the first camera, and the second camera. The mapping matrix may include a mapping matrix between the three-dimensional image data and the first camera, a mapping matrix between the three-dimensional image data and the second camera, and a mapping matrix between the first camera and the second camera. Each element in the mapping matrix may reflect the three-dimensional image data and the first image data, or the three-dimensional image data and the second image data, or the coordinate relationship of the same position between the first image data and the second image data.

In some embodiments, the mapping matrix may include the rotation matrix and the translation matrix. For example, the mapping matrix (e.g., the first mapping matrix) between the three-dimensional image data and the first camera may include a first rotation matrix R1 in which the three-dimensional image data is mapped to the first image data and a first translation matrix T1 in which the three-dimensional image data is mapped to the first image data. The first rotation matrix R1 describes the direction of the coordinate axis of the world coordinate system relative to a first camera coordinate axis. The first translation matrix T1 describes the position of the spatial origin in a first camera coordinate system. As another example, the mapping matrix (e.g., the second mapping matrix) between the three-dimensional image data and the second camera may include a second rotation matrix R2 in which the three-dimensional image data is mapped to the second image data and a second translation matrix T2 in which the three-dimensional image data is mapped to the second image data. The second rotation matrix R2 describes the direction of the coordinate axis of the world coordinate system relative to a second camera coordinate axis. The second translation matrix T2 describes the position of the spatial origin in a second camera coordinate system. As another example, the mapping matrix (e.g., the binocular mapping matrix) between the first camera and the second camera may include a binocular rotation matrix R in which the first image data is mapped to the second image data and a binocular translation matrix T in which the first image data is mapped to the second image data. The binocular rotation matrix R describes the direction of the first camera coordinate axis relative to the second camera coordinate axis. The binocular translation matrix T describes the origin position of the first camera coordinate system in the second camera coordinate system.

In some embodiments, the mapping module may obtain the mapping matrix through various ways. For example, the mapping module may obtain the mapping matrix through algorithm calculation. Exemplarily, the mapping module may calculate the mapping matrix between the three-dimensional image data and the first camera, and the mapping matrix between the three-dimensional image data and the second camera through the mapping algorithm. The mapping module may calculate the mapping matrix between the first camera and the second camera according to a formula. The calculation formula of the binocular rotation matrix R may be expressed as $R=R2*R1\textasciicircum T$. The calculation formula of the binocular translation matrix T may be expressed as $T=T2*T1\textasciicircum T$, and $\textasciicircum T$ represents the transposition of the matrix.

Step 320, determining the calibration value based on the mapping matrix.

The calibration value may refer to a matrix after the mapping matrix is calibrated. The mapping module may adjust the mapping matrix based on the calibration parameters to determine the calibration value. For example, the mapping matrix A between the three-dimensional image data and the first camera is adjusted and the matrix (wA) is obtained, where w is the calibration parameter of the mapping matrix A, the calibration value of the mapping matrix between the three-dimensional image data and the first camera is the matrix (wA).

The mapping module may determine the calibration value of the mapping matrix in various ways. In some embodiments, the mapping module may determine the calibration value of the mapping matrix based on historical data. For example, the mapping module may obtain the calibration value of the historical time point closest to the current time point in the historical mapping matrix as the calibration value of the current mapping matrix.

In some embodiments, the mapping module may determine the prediction value of the mapping matrix based on the mapping matrix, and determine the calibration value of the mapping matrix based on the prediction value.

The prediction value of the mapping matrix refers to the mapping matrix predicted based on factors such as production line vibration. For example, the matrix (kB) is obtained after predicting the mapping matrix B between the three-dimensional image data and the second camera, where k is the prediction parameter of the mapping matrix B, and the prediction value of the mapping matrix between the three-dimensional image data and the second camera is the matrix (kB).

The mapping module may determine the prediction value of the mapping matrix in various ways. In some embodiments, the mapping module may analyze and process the relationship between factors such as production line vibration and the mapping matrix, and determine the prediction value of the mapping matrix. For example, a change function which represents the impact of the production line vibration on the mapping matrix may be determined based on the historical data, and the prediction value of the current mapping matrix is determined through the change function calculation based on the current production line vibration situation and the current mapping matrix.

In some embodiments, the mapping module may determine different prediction values for different mapping matrices through a first prediction model or a second prediction model. For example, the mapping module may predict a first prediction value of the first mapping matrix through the first prediction mode based on the first mapping matrix. As another example, the mapping module may predict a second prediction value of the second mapping matrix through the second prediction mode based on the second mapping matrix. For detailed descriptions of different prediction values of different mapping matrices through the first prediction model or the second prediction model, see FIG. 4a or FIG. 4b and its related content.

In some embodiments, the mapping module may determine the calibration value of the mapping matrix based on the prediction value in various ways. For example, the mapping module may establish a relationship function between the prediction value and the corresponding calibration value by analyzing and processing the historical prediction value and the corresponding historical calibration value, and then determine the calibration value of the current mapping matrix. As another example, the mapping module may further determine a first calibration value of the first mapping matrix and a second calibration value of the second mapping matrix by using a binocular calibration model. For a detailed description of determining the first calibration value of the first mapping matrix and the second calibration value of the second mapping matrix by the binocular calibration model, please refer to FIG. 5 and its related contents.

The calibration value of the mapping matrix is determined based on the prediction value, and the influence of factors such as production line vibration on the mapping matrix can be comprehensively considered, so that the calibration value of the mapping matrix can be determined more accurately.

Step 330, mapping the judgment point positions to the first image data to form the first calibration point positions, and mapping the judgment point positions to the second image data to form the second calibration point positions based on the calibration value.

The judgment point positions refer to a plurality of point positions obtained from the distortion part of the three-dimensional image data. For a detailed description of the judgment point positions, the first calibration point positions, and the second calibration point positions, please refer to the related content of FIG. 1.

The mapping the judgment point positions to the first image data and the second image data refers to determining the point positions corresponding to the judgment point positions in the first image data and the second image data, respectively, based on the three-dimensional image data and the calibration values of the mapping matrices of the first image data and the second image data.

In some embodiments, the mapping module may obtain the first calibration point positions and the second calibration point positions corresponding to the judgment point positions by formula calculation based on the calibration value. For example, the first calibration point positions and the second calibration point positions may be determined based on a coordinate transformation formula $X*H=Y$, X represents the coordinates of the judgment point positions in the three-dimensional image data, and H represents the calibration value of the mapping matrix of the three-dimensional image data and the first image data, or the calibration value of the mapping matrix of the three-dimensional image data and the second image data. When H represents the calibration value of the mapping matrix between the three-dimensional image data and the first image data, Y represents the coordinates of the first calibration point positions where the judgment point positions are mapped to in the first image data. When H represents the calibration value of the mapping matrix between the three-dimensional image data and the second image data, Y represents the coordinates of the second calibration point positions where the judgment point positions are mapped to in the second image data.

By determining the calibration point positions of the judgment point positions in the first image data and the second image data based on the calibration value of the mapping matrix, the adjustment parameters of the binocular camera can be accurately determined, thereby improving the visual recognition accuracy of the binocular camera, and effectively improving the production efficiency and equipment operation accuracy.

In some embodiments, the mapping matrix may include a first mapping matrix and a second mapping matrix. The first mapping matrix may represent the mapping between the three-dimensional image data and the first camera. The second mapping matrix may represent the mapping between the three-dimensional image data and the second camera. For more content about the mapping between the three-dimensional image data and the first camera or the second camera, please refer to FIG. 3 and related descriptions.

Figure 4A:
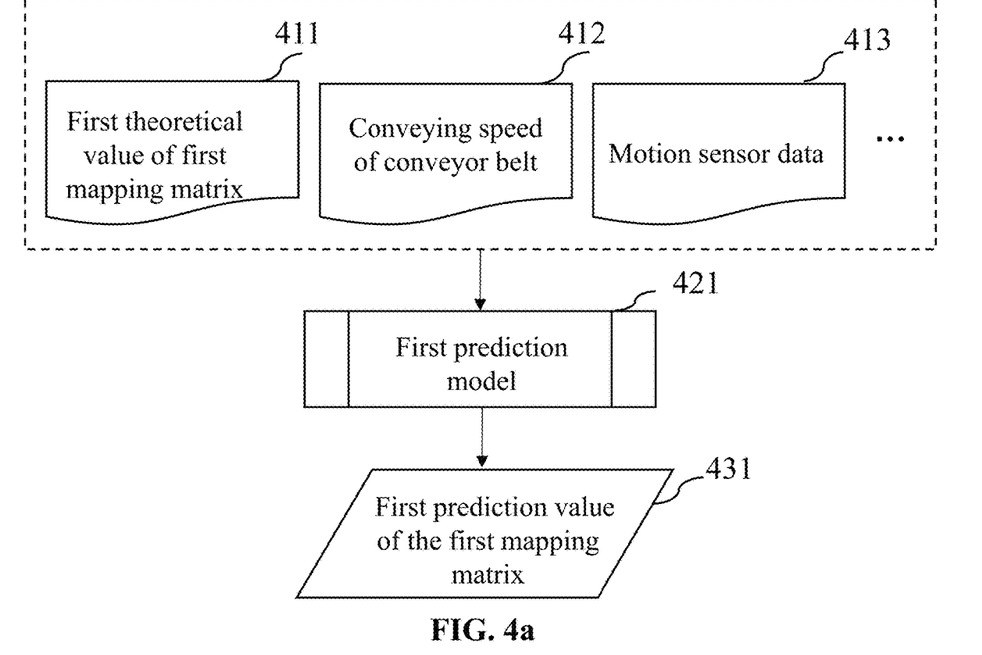
FIG. 4a is an exemplary schematic diagram of predicting the first prediction value by the first prediction model according to some embodiments of the present disclosure.

FIG. 4a is an exemplary schematic diagram of predicting the first prediction value through the first prediction model according to some embodiments of this disclosure.

In some embodiments, the mapping module may predict the first prediction value of the first mapping matrix through the first prediction model based on the first mapping matrix.

The first prediction model 421 may be a machine learning model. In some embodiments, the type of the first prediction model may include a neural network model, etc., and the selection of the model type may depend on specific circumstances.

In some embodiments, the input of the first prediction model may include a first theoretical value 411 of the first mapping matrix, a conveying speed of a conveyor belt 412, a motion sensor data 413, and the like. The output of the first prediction model may include the first prediction value 431 of the first mapping matrix.

The first theoretical value may refer to the first mapping matrix obtained by mapping the three-dimensional image data without the influence of other factors to the first image data. Other factors may include production line vibration, other external factors, etc. The first mapping matrix may include a first rotation matrix and a first translation matrix. For more content about the first rotation matrix and the first translation matrix, please refer to the related description of FIG. 3.

In some embodiments, the mapping module may determine the first rotation matrix and the first translation matrix corresponding to the last (e.g., the (n−1)th) calibration of the first camera as the first theoretical value of the first mapping matrix corresponding to this (e.g., the nth) calibration. When the mapping module performs the next (e.g., the (n+1)th) calibration, the mapping module may determine the first rotation matrix and the first translation matrix corresponding to this (e.g., the nth) calibration as the first theoretical value of the first mapping matrix corresponding to the next (e.g., the (n+1)th) calibration.

The conveying speed of the conveyor belt may be determined by the set working parameters of the conveyor belt. For example, the conveying speed of the conveyor belt is set to 2.5 m/s or the like.

The motion sensor data may refer to the relevant data obtained through a motion sensor. The motion sensor data may include motion attitude (e.g., the attitude angles in the three directions of Rx, Ry, and Rz), acceleration (e.g., the acceleration in the three directions of x, y, and z), vibration intensity (e.g., the amplitude and the vibration frequency), etc. of the detected object. The detected object may refer to a product produced on the production line.

The first prediction value may be the prediction value of the first mapping matrix. The first prediction value may include the prediction value of the first rotation matrix and the prediction value of the first translation matrix. The prediction value of the first rotation matrix may reflect the rotation matrix in which the three-dimensional image data is mapped to the first image data in the case of considering factors such as production line vibration. The prediction value of the first translation matrix may reflect the translation matrix in which the three-dimensional image data is mapped to the first image data in the case of considering factors such as production line vibration.

In some embodiments, the mapping module may obtain the first prediction model, the second prediction model and the binocular calibration model through joint training. For more details about joint training, please refer to the related description of FIG. 5.

Figure 4B:
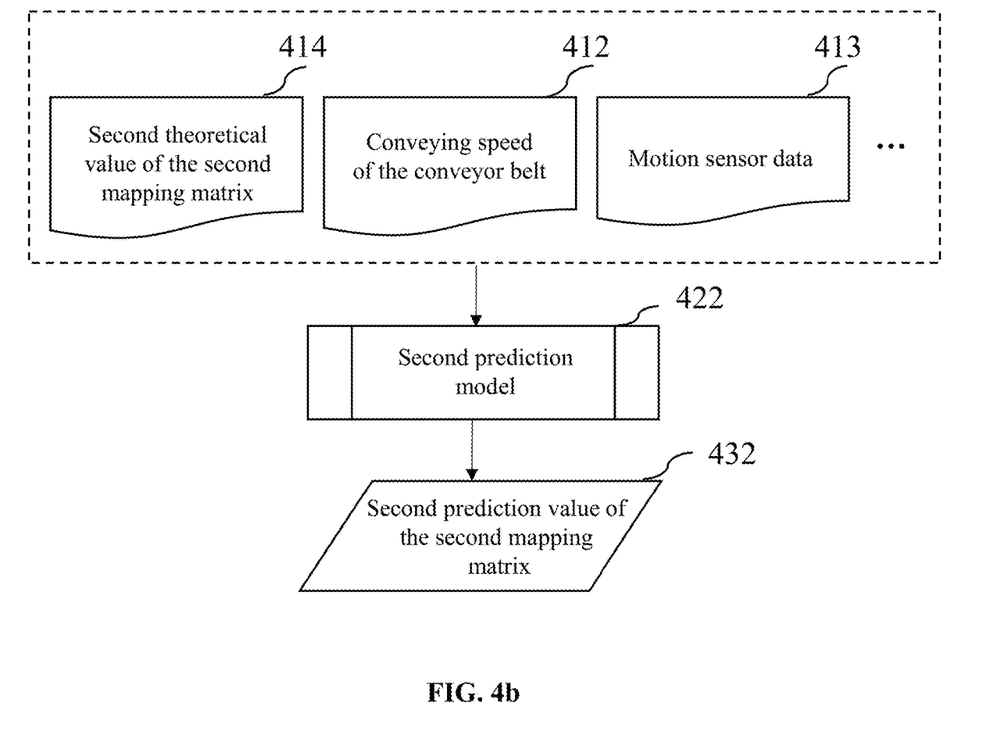
FIG. 4b is an exemplary schematic diagram of predicting the second prediction value by the second prediction model according to some embodiments of the present disclosure.

FIG. 4b is an exemplary schematic diagram of predicting the second prediction through the second prediction model according to some embodiments of this disclosure.

In some embodiments, the mapping module may predict the second prediction value of the second mapping matrix through the second prediction model based on the second mapping matrix.

The second prediction model 422 may be a machine learning model. In some embodiments, the type of the second prediction model may include a neural network model, etc., and the selection of the model type may depend on specific circumstances.

In some embodiments, the input of the second prediction model may include a second theoretical value 414 of the second mapping matrix, a conveying speed of the conveyor belt 412, and a motion sensor data 413. The output of the second prediction model may include the second prediction value 432 of the second mapping matrix.

The second theoretical value may refer to the second mapping matrix obtained by mapping the three-dimensional image data without the influence of other factors to the second image data. Other factors may include production line vibration, other external factors, etc. The second mapping matrix may include a second rotation matrix and a second translation matrix. For more content about the second rotation matrix and the second translation matrix, please refer to the related description of FIG. 3.

In some embodiments, the mapping module may determine the second rotation matrix and the second translation matrix corresponding to the last (e.g., the (n−1)th) calibration of the second camera as the second theoretical value of the second mapping matrix corresponding to this (e.g., the nth) calibration. When the mapping module performs the next (e.g., the (n+1)th) calibration, the mapping module may determine the second rotation matrix and the second translation matrix corresponding to this (e.g., the nth) calibration as the second theoretical value of the second mapping matrix corresponding to the next (e.g., the (n+1)th) calibration.

The second prediction value may be the prediction value of the second mapping matrix. The second prediction value may include the prediction value of the second rotation matrix and the prediction value of the second translation matrix. The prediction value of the second rotation matrix may reflect the rotation matrix in which the three-dimensional image data is mapped to the second image data in consideration of factors such as production line vibration. The prediction value of the second translation matrix may reflect the translation matrix obtained by mapping the three-dimensional image data to the second image data in consideration of factors such as production line vibration.

In some embodiments, the mapping module may obtain the first prediction model, the second prediction model and the binocular calibration model through joint training. For more details about joint training, please refer to the related description of FIG. 5.

By predicting the first/second prediction value by the first/second prediction model, factors such as production line vibration may be comprehensively considered, so that the first/second prediction value of the first/second mapping matrix can be determined more accurately, which is more conducive to improving the accuracy of three-dimensional machine vision recognition, and effectively improving the production efficiency and equipment operation accuracy.

Figure 5:
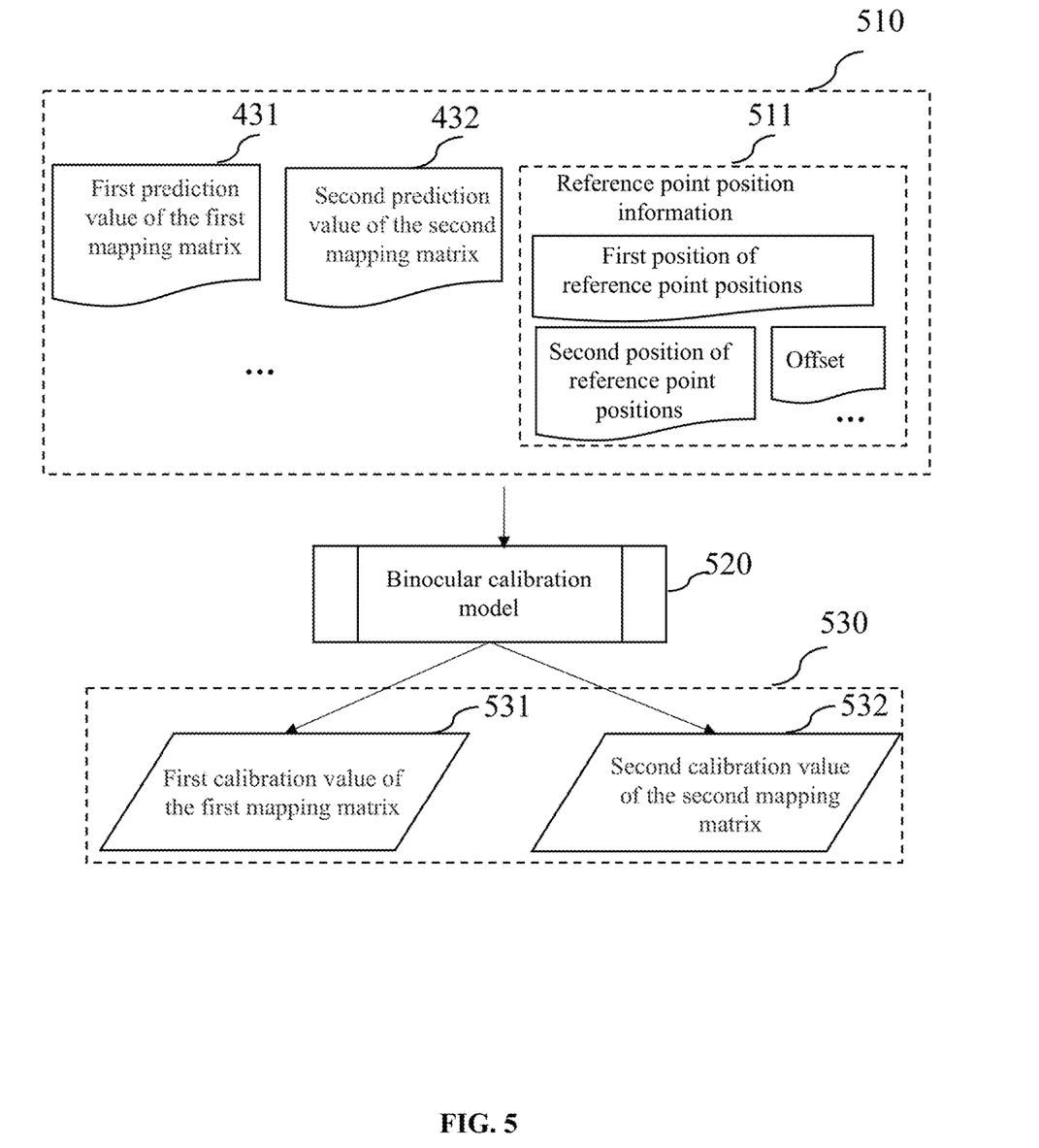
FIG. 5 is an exemplary schematic diagram of determining the first calibration value and the second calibration value through the binocular calibration model according to some embodiments of the present disclosure.

FIG. 5 is an exemplary schematic diagram of determining the first calibration value and the second calibration value through the binocular calibration model according to some embodiments of this disclosure. As shown in FIG. 5, the determining the first calibration value and the second calibration value through the binocular calibration model includes the following contents. In some embodiments, the contents of FIG. 5 may be completed by the mapping module.

In some embodiments, the calibration value includes the first calibration value and the second calibration value. The mapping module may determine the first calibration value of the first mapping matrix and the second calibration value of the second mapping matrix through the binocular calibration model based on the first prediction value and the second prediction value. The binocular calibration model is a machine learning model. The first calibration value includes a first rotation matrix calibration value and a first translation matrix calibration value. The second calibration value includes a second rotation matrix calibration value and a second translation matrix calibration value. The first calibration value is used to map the judgment point positions to the first image data to form the first calibration point positions. The second calibration value is used to map the judgment point positions to the second image data to form the second calibration point positions.

The first calibration value refers to a calibration value corresponding to the first mapping matrix. The first calibration value may include the first rotation matrix calibration value and the first translation matrix calibration value. The first rotation matrix calibration value refers to the calibration value of the rotation matrix in which the three-dimensional image data is mapped to the first image data. The first translation matrix calibration value refers to the calibration value of the translation matrix in which the three-dimensional image data is mapped to the first image data. The first calibration value is used to map the judgment point positions to the first image data to form the first calibration point positions. For more instructions on the first calibration value, please refer to the relevant contents of FIG. 3.

The second calibration value refers to the calibration value corresponding to the second mapping matrix. The second calibration value may include the second rotation matrix calibration value and the second translation matrix calibration value. The second rotation matrix calibration value refers to the calibration value of the rotation matrix in which the three-dimensional image data is mapped to the second image data. The second translation matrix calibration value refers to the calibration value of the translation matrix in which the three-dimensional image data is mapped to the second image data. The second calibration value is used to map the judgment point positions to the second image data to form the second calibration point positions. For more description of the second calibration value, please refer to the relevant contents of FIG. 3.

The binocular calibration model 520 is used for calibrating the first mapping matrix and the second mapping matrix based on the reference point position information. In some embodiments, the binocular calibration model may be a trained machine learning model. For example, the binocular calibration model may be a Deep Neural Networks (DNN) model, etc.

The input 510 of the binocular calibration model may include the first prediction value 431 of the first mapping matrix, the second prediction value 432 of the second mapping matrix, the conveying speed of the conveyor belt, the motion sensor data, and the like. Data about the conveying speed of the conveyor belt and the motion sensor data is not shown in FIG. 5. The output 530 of the binocular calibration model may be a first calibration value 531 of the first mapping matrix and a second calibration value 532 of the second mapping matrix. For definitions and descriptions of the first prediction value 431 of the first mapping matrix, the second prediction value 432 of the second mapping matrix, the conveying speed of the conveyor belt and the motion sensor data, please refer to the relevant contents of FIG. 4a or FIG. 4b.

In some embodiments, the input 510 of the binocular calibration model may also include reference point position information 511. The reference point position information includes at least one of a first position and a second position of the reference point position. The reference point position is the preset point position in the three-dimensional image data. The first position is a position in the first image data corresponding to the reference point position. The second position is a position in the second image data corresponding to the reference point position.

The reference point position is the preset point position in the three-dimensional image data. The preset point position refers to a landmark point position that is easy to be measured in the three-dimensional image data. For example, the preset point positions are the center point, the highest point, the lowest point, etc. of the three-dimensional image data.

In some embodiments, the reference point position information may include at least one of the first position and the second position of the reference point position. For example, for a plurality of reference point positions a, b, c, the reference point position information may include a first position of the reference point position a, a second position of the reference point position b, and a first position and a second position of the reference point position c.

The first position is a position in the first image data corresponding to the reference point position. For example, the first position is the actual position of the reference point position on the first image data. In some embodiments, the first position may be obtained by manual measurement.

The second position is a position in the second image data corresponding to the reference point position. For example, the second position is the actual position of the reference point position on the second image data. In some embodiments, the second position may be obtained by manual measurement.

The reference point position information is inputted into the binocular calibration model, and the reference point position information may be used to assist in determining the calibration value, making the determination of the calibration value more accurate.

In some embodiments, the reference point position information 511 further includes an offset. The offset is a vector difference between a first position vector and a second position vector of the second position. The first position vector is a position vector of the first position which is mapped to the second image data based on the binocular prediction value of the binocular mapping matrix. The binocular mapping matrix represents the mapping between the first camera and the second camera.

The offset is the vector difference between the first position vector and the second position vector of the second position.

The first position vector is a position vector of the first position which is mapped to the second image data based on the binocular prediction value of the binocular mapping matrix. The second position vector refers to a vector of the position in the second image data corresponding to the reference point position.

For example, the first position P of the reference point position in the first image data is (3, 2), and the position P' to which the first position is mapped in the second image data based on the binocular prediction value of the binocular mapping matrix is (1, 5), the origin of the coordinate system of the second image data is O, then a vector $\overrightarrow{OP'}=(1, 5)$ may be constructed as the first position vector. If the second position point P'' of the reference point position in the second image data is (2, 4), a vector $\overrightarrow{OP''}=(2, 4)$ may be constructed as the second position vector, the vector difference between the first position vector and the second position vector may be expressed as=(1, −1).

The binocular mapping matrix is the mapping matrix between the first camera and the second camera. For more descriptions of the mapping matrix between the first camera and the second camera, please refer to the relevant contents of FIG. 3.

The binocular prediction value refers to the prediction value for the binocular mapping matrix. For example, the matrix (sC) is obtained after predicting the binocular mapping matrix C, where s is the prediction parameter of the binocular mapping matrix C, and the prediction value of the binocular prediction matrix is the matrix (sC).

In some embodiments, the mapping module may obtain the binocular prediction value based on historical data. For example, the mapping module may determine a binocular prediction value whose historical time point is closest to the current time point among the historical binocular prediction values as the current binocular prediction value.

In some embodiments, the mapping module may also determine the binocular prediction value based on the first prediction value and the second prediction value. For example, the binocular prediction value may be determined based on the calculation formula between the first prediction value of the first mapping matrix, the second prediction value of the second mapping matrix, and the binocular prediction value of the binocular mapping matrix (e.g., the calculation formula of the binocular rotation matrix R and the calculation formula of the binocular translation matrix T). The specific calculation method may refer to the relevant description in FIG. 3.

The binocular prediction value may be determined by quantitative calculation based on the first prediction value and the second prediction value, so that the obtained binocular prediction value is more accurate. Therefore, the first position vector may be obtained more accurately, thereby increasing the accuracy of the obtained calibration value.

By inputting the offset as the reference point position information into the binocular calibration model, the deviation caused by factors other than the vibration factor of the production line can be fully considered, so that the obtained calibration value is more accurate.

In some embodiments, the training method of the first prediction model, the second prediction model and the binocular calibration model includes joint training.

In some embodiments, the mapping module may train the first prediction model, the second prediction model, and the binocular calibration model based on a large number of labeled groups of training samples. Each group of training samples may include the first sample theoretical value, the second sample theoretical value, the sample conveying speed of the conveyor belt, the sample motion sensor data, the sample reference point position information, and the like. The labels of each group of training samples are the first calibration value of the first sample mapping matrix and the second calibration value of the second sample mapping matrix corresponding to the group of training samples. In some embodiments, a plurality of groups of training samples and labels may be derived from historical data. Exemplarily, the sample conveying speed of the conveyor belt and the sample motion sensor data may be derived from the historical production line data. The sample reference point position information may be derived from historical reference point position information. In some embodiments, the labels of each group of training samples may be derived from the historical data, such as the historical calibration records corresponding to each group of training samples, respectively.

During the joint training process, the mapping module may input the first sample theoretical value, the sample conveying speed of the conveyor belt, and the sample motion sensor data in each group of training samples with labels into an initial first prediction model to obtain the first prediction value of the first mapping matrix outputted by the initial first prediction model. The mapping module inputs the second sample theoretical value of the, the sample conveying speed of the conveyor belt, and the sample motion sensor data in the group of training samples into an initial second prediction model to obtain the second prediction value of the second mapping matrix outputted by the initial second prediction model. The mapping module inputs the first prediction value of the first mapping matrix outputted by the initial first prediction model, the second prediction value of the second mapping matrix outputted by the initial second prediction model, the sample conveying speed of the conveyor belt in the above-mentioned group of training samples, the sample motion sensor data and the sample reference point position information, etc. into an initial binocular calibration model to obtain the outputted first calibration value of the first mapping matrix and the second calibration value of the second mapping matrix. A loss function is constructed based on the output and the labels of the binocular calibration model, the parameters of the first prediction model, the second prediction model and the binocular calibration model are updated based on the loss function, and the trained first prediction model, the second prediction model and the binocular calibration model are obtained.

In some embodiments of this disclosure, the joint training of the first prediction model, the second prediction model and the binocular calibration model is beneficial to solve the problem of difficulty in obtaining labels when training the above models alone, reduce the number of samples required and improve the training efficiency. In some embodiments, the output accuracy of the trained first prediction model, the trained second prediction model and the trained binocular calibration model may be higher through joint training, so that more accurate first calibration value and second calibration may be obtained.

In some embodiments of this disclosure, the first calibration value and the second calibration value are determined in combination with the reference point position, the first prediction value and the second prediction value. While fully considering the influence of the vibration factor of the production line, it is also possible to reduce the deviation caused by factors other than the vibration factor of the production line. Therefore, the calibrated mapping matrix is more accurate, which is more conducive to improving the accuracy of three-dimensional machine vision recognition, and effectively improves the production efficiency and equipment operation accuracy.

Ordinary technicians skilled in the art may realize that units and algorithm steps of each example described in combination with the embodiments disclosed herein may be implemented by electronic hardware, computer software, or a combination of the two. In order to clearly illustrate the interchangeability of hardware and software, the components and steps of each example have been described generally in terms of functionality in the above description. Whether these functions are implemented in hardware or software depends on the specific application and design constraints of the technical scheme. The technicians skilled in the art may implement the described functionality by using different methods for each particular application, but such implementations should not be considered beyond the scope of this disclosure.

In the plurality of embodiments provided in this disclosure, it should be understood that the disclosed devices and methods may be implemented in other manners. For example, the devices described above are only illustrative. For example, the division of the units is only a logical function division. In actual implementation, there may be other division methods. For example, a plurality of units or components may be combined or may be integrated into another system, or some features may be ignored, or not implemented. In addition, the shown or discussed mutual coupling or direct coupling or communication connection may be indirect coupling or communication connection through some interfaces, devices or units, and may also be electrical, mechanical or other forms of connection.

The unit described as a separate component may or may not be physically separated. As a unit, it is obvious that ordinary technicians skilled in the art may realize that the unit and algorithm steps of each example described in combination with the embodiments disclosed herein may be implemented by electronic hardware, computer software or a combination of the two. In order to clearly illustrate the interchangeability of hardware and software, the above description has generally described the components and steps of each example in terms of functionality. Whether these functions are implemented in hardware or software depends on the specific application and design constraints of the technical scheme. The technicians skilled in the art may implement the described functionality by using different methods for each particular application, but such implementations should not be considered beyond the scope of this disclosure.

In addition, each functional unit in each embodiment of this disclosure may be integrated into one processing unit, or each unit may exist physically alone, or two or more units may be integrated into one unit. The above-mentioned integrated unit may be implemented in the form of hardware, or may be implemented in the form of a software functional unit.

The integrated unit, if implemented in the form of a software functional unit and sold or used as an independent product, may be stored in a computer readable storage medium. Based on this understanding, the essential technical schemes of this disclosure or parts of the technical schemes that contribute to the prior art, or all or part of the technical schemes may be embodied in the form of software products. The computer software product is stored in a storage medium, and includes a plurality of instructions for causing a set of computer equipment (which may be a personal computer, a server, or grid equipment, etc.) to execute all or part of the steps of the methods described in the various embodiments of this disclosure. The aforementioned storage medium includes: a U disk, a mobile hard disk, a Read-Only Memory (ROM), a Random Access Memory (RAM), a magnetic disk or an optical disk and other media capable of storing program codes.

The specific embodiments described above further describe the purpose, technical schemes and beneficial effects of this disclosure in detail. It should be understood that the above descriptions are only specific implementations of this disclosure, and are not intended to limit the protection scope of this disclosure. Any modification, equivalent replacement, improvement, etc. made within the spirit and principle of this disclosure shall be included within the protection scope of this disclosure.

What is claimed is:

1. An intelligent manufacturing industrial Internet of Things with a front split service platform for calibrating a binocular camera, comprising a service platform, a management platform, and a sensor network platform which interact in sequence, wherein the management platform includes:
   an obtaining module configured to obtain an image taken by a first camera on a production line as first image data and an image taken by a second camera as second image data through the sensor network platform; the first camera and the second camera forming the binocular camera;
   a three-dimensional module configured to process the first image data and the second image data into three-dimensional image data;
   a recognition module configured to obtain a plurality of point positions of a distortion part as judgment point positions when detecting the distortion of the three-dimensional image data;
   a mapping module configured to
   obtain a mapping matrix, wherein the mapping matrix represents a mapping relationship between any two of the three-dimensional image data, the first camera, and the second camera, the mapping matrix including a rotation matrix and a translation matrix;
   determine a prediction value of the mapping matrix based on the mapping matrix;
   determine a calibration value based on the prediction value; and
   map the judgment point positions to the first image data to form first calibration point positions based on the calibration value, and map the judgment point positions to the second image data to form second calibration point positions; and
   a calibration module configured to calibrate the first camera and the second camera based on the first calibration point positions and the second calibration point positions; and
   the service platform includes:
   a plurality of service sub-platforms configured to respectively receive different calibration data of the binocular camera; and
   a general service platform configured to summarize all the calibration data and display the calibration data through a user platform.

2. The intelligent manufacturing industrial Internet of Things with the front split service platform of claim 1, wherein the mapping matrix includes a first mapping matrix and a second mapping matrix, the first mapping matrix represents the mapping between the three-dimensional image data and the first camera, and the second mapping matrix represents the mapping between the three-dimensional image data and the second camera, and the mapping module is further configured to:
   predict a first prediction value of the first mapping matrix by a first prediction model based on the first mapping matrix, wherein the first prediction model is a machine learning model, and the input of the first prediction model includes a first theoretical value of the first mapping matrix, a conveying speed of a conveyor belt, and motion sensor data; and
   predict a second prediction value of the second mapping matrix by a second prediction model based on the second mapping matrix, wherein the second prediction model is a machine learning model, and the input of the second prediction model includes a second theoretical value of the second mapping matrix, the conveying speed of the conveyor belt, and the motion sensor data.

3. The intelligent manufacturing industrial Internet of Things with the front split service platform of claim 2, wherein the calibration value includes a first calibration value and a second calibration value, and the mapping module is further configured to:
   determine the first calibration value of the first mapping matrix and the second calibration value of the second mapping matrix by a binocular calibration model based on the first prediction value and the second prediction value, wherein the binocular calibration model is a machine learning model, the first calibration value includes a first rotation matrix calibration value and a first translation matrix calibration value, the second calibration value includes a second rotation matrix calibration value and a second translation matrix calibration value, the first calibration value is used to map the judgment point positions to the first image data to form the first calibration point positions, and the second calibration value is used to map the judgment point positions to the second image data to form the second calibration point positions.

4. The intelligent manufacturing industrial Internet of Things with the front split service platform of claim 3, wherein a training manner of the first prediction model, the second prediction model and the binocular calibration model includes joint training.

5. The intelligent manufacturing industrial Internet of Things with the front split service platform of claim 3, wherein the input of the binocular calibration model includes reference point position information, the reference point position information includes at least one of a first position and a second position of a reference point position, the reference point position is a preset point position in the three-dimensional image data, the first position is a position in the first image data corresponding to the reference point position, and the second position is a position in the second image data corresponding to the reference point position.

6. The intelligent manufacturing industrial Internet of Things with the front split service platform of claim 5, wherein the reference point position information further comprises an offset, the offset is a vector difference between a first position vector and a second position vector of the second position, the first position vector is a vector of a position to which the first position is mapped in the second image data based on a binocular prediction value of a binocular mapping matrix, and the binocular mapping matrix represents the mapping between the first camera and the second camera.

7. The intelligent manufacturing industrial Internet of Things with the front split service platform of claim 6, wherein the mapping module is further configured to:
determine the binocular prediction value based on the first prediction value and the second prediction value.

8. The intelligent manufacturing industrial Internet of Things with the front split service platform of claim 1, wherein the recognition module is further configured to:
detect whether the three-dimensional image data is distorted according to a preset template;
establish a region of interest with a point of maximum distortion as a center when detecting the distortion of the three-dimensional image data;
recognize at least two continuous distortion edges from the region of interest according to the preset template, and if at least two continuous distortion edges are not recognized, redefine the region of interest and perform recognition again;
recognize a separation edge and a common edge from the distortion edges according to the preset template, extract a plurality of point positions from the separation edge as first point positions, and extract a plurality of point positions from the common edge as second point positions, wherein the separation edge is an edge where the same point positions in the first image data and the second image data do not overlap in the three-dimensional image data, and the common edge is an edge where the same point positions in the first image data and the second image data overlap in the three-dimensional image data; and
use the first point positions and the second point positions as the judgment point positions.

9. The intelligent manufacturing industrial Internet of Things with the front split service platform of claim 8, wherein the calibration module is further configured to:
when calibrating the first camera and the second camera according to the first calibration point positions and the second calibration point positions, invert a calibration matrix for generating the three-dimensional image data according to first check point positions, and check an inversion result of the calibration matrix according to second check point positions to form adjustment parameters of the first camera and/or the second camera, wherein the first check point positions are the first calibration point positions and the second calibration point positions generated by mapping the first point positions into the first image data and the second image data, respectively, and the second check point positions are the first calibration point positions and the second calibration point positions generated by mapping the second point positions into the first image data and the second image data, respectively; and
calibrate the first camera and/or the second camera based on the adjustment parameters.

10. The intelligent manufacturing industrial Internet of Things with the front split service platform of claim 8, wherein the preset template includes a plurality of recognition edges; and
the recognition module is further configured to:
periodically compare the preset template with the three-dimensional image data, and judge that the three-dimensional image data is distorted when a difference between any recognition edge and corresponding edge data in the three-dimensional image data is greater than a preset value.

11. The intelligent manufacturing industrial Internet of Things with the front split service platform of claim 10, wherein the recognition module is further configured to:
recognize, according to each of the recognition edges in the preset template, a distortion edge from the region of interest as the separation edge, and extend the separation edge along the recognition edge to form the common edge.

12. A control method of intelligent manufacturing industrial Internet of Things with a front split service platform for calibrating a binocular camera, applied to a service platform, a management platform, and a sensor network platform which interact in sequence, wherein the service platform includes a general service platform and a plurality of service sub-platforms;
the control method executed by the management platform comprises:
obtaining an image taken by a first camera on a production line as first image data, and an image taken by a second camera as second image data through the sensor network platform; the first camera and the second camera forming the binocular camera;
processing the first image data and the second image data into three-dimensional image data;
obtaining a plurality of point positions of a distortion part as judgment point positions when detecting the distortion of the three-dimensional image data;
obtaining a mapping matrix, wherein the mapping matrix represents a mapping relationship between any two of the three-dimensional image data, the first camera, and the second camera, the mapping matrix including a rotation matrix and a translation matrix;
determining a prediction value of the mapping matrix based on the mapping matrix;
determining a calibration value based on the prediction value; and
mapping the judgment point positions to the first image data to form first calibration point positions based on the calibration value, and mapping the judgment point positions to the second image data to form second calibration point positions;

calibrating the first camera and the second camera based on the first calibration point positions and the second calibration point positions;

the service sub-platforms receiving different calibration data of the binocular camera respectively; and the general service platform summarizing all the calibration data and displaying the calibration data through a user platform.

13. The control method of claim 12, wherein the mapping matrix includes a first mapping matrix and a second mapping matrix, the first mapping matrix represents the mapping between the three-dimensional image data and the first camera, and the second mapping matrix represents the mapping between the three-dimensional image data and the second camera, and the control method further comprises:

predicting a first prediction value of the first mapping matrix by a first prediction model based on the first mapping matrix, wherein the first prediction model is a machine learning model, and the input of the first prediction model includes a first theoretical value of the first mapping matrix, a conveying speed of a conveyor belt, and motion sensor data; and predicting a second prediction value of the second mapping matrix by a second prediction model based on the second mapping matrix, wherein the second prediction model is a machine learning model, and the input of the second prediction model includes a second theoretical value of the second mapping matrix, the conveying speed of the conveyor belt, and the motion sensor data.

14. The control method of claim 13, wherein the calibration value includes a first calibration value and a second calibration value, and the control method includes:

determining the first calibration value of the first mapping matrix and the second calibration value of the second mapping matrix by a binocular calibration model based on the first prediction value and the second prediction value, wherein the binocular calibration model is a machine learning model, the first calibration value includes a first rotation matrix calibration value and a first translation matrix calibration value, the second calibration value includes a second rotation matrix calibration value and a second translation matrix calibration value, the first calibration value is used to map the judgment point positions to the first image data to form the first calibration point positions, and the second calibration value is used to map the judgment point positions to the second image data to form the second calibration point positions.

15. The control method of claim 14, wherein a training manner of the first prediction model, the second prediction model and the binocular calibration model includes joint training.

16. The control method of claim 12, wherein the obtaining a plurality of point positions of the distortion part as the judgment point positions when detecting the distortion of the three-dimensional image data includes:

detecting whether the three-dimensional image data is distorted according to a preset template;

when detecting the distortion of the three-dimensional image data, establishing a region of interest with a point of maximum distortion as a center;

recognizing at least two continuous distortion edges from the region of interest according to the preset template, and if at least two continuous distortion edges are not recognized, redefining the region of interest and performing recognition again;

recognizing a separation edge and a common edge from the distortion edges according to the preset template, extracting a plurality of point positions from the separation edge as first point positions, and extracting a plurality of point positions from the common edge as second point positions; the separation edge being an edge where the same point positions in the first image data and the second image data do not overlap in the three-dimensional image data; the common edge being an edge where the same point positions in the first image data and the second image data overlap in the three-dimensional image data; and using the first point positions and the second point positions as the judgment point positions.

17. The control method of claim 16, wherein the calibrating the first camera and the second camera according to the first calibration point positions and the second calibration point positions includes:

when calibrating the first camera and the second camera according to the first calibration point positions and the second calibration point positions, inverting the calibration matrix for generating the three-dimensional image data according to first check point positions, and checking an inversion result according to second check point positions to form adjustment parameters of the first camera and/or the second camera; the first check point positions being the first calibration point positions and the second calibration point positions generated by mapping the first point positions into the first image data and the second image data, respectively; the second check point positions being the first calibration point positions and the second calibration point positions generated by mapping the second point positions into the first image data and the second image data, respectively; and calibrating the first camera and/or the second camera based on the adjustment parameters.

18. The control method of claim 16, wherein the preset template includes a plurality of recognition edges; and the detecting whether the three-dimensional image data is distorted according to the preset template includes:

periodically comparing the preset template with the three-dimensional image data, and judging that the three-dimensional image data is distorted when a difference between any recognition edge and corresponding edge data in the three-dimensional image data is greater than a preset value.

19. The control method of claim 18, wherein the recognizing the separation edge and the common edge from the distortion edge according to the preset template includes:

recognizing, according to the recognition edges in the preset template, a distortion edge from the region of interest as the separation edge, and extending the separation edge along the recognition edge to form the common edge.

20. A non-transitory computer readable storage medium, wherein the storage medium stores computer instructions, and when the computer instructions are executed by a processor, the control method of claim 12 is implemented.

* * * * *